United States Patent
Kuraoka et al.

(10) Patent No.: US 7,031,475 B2
(45) Date of Patent: Apr. 18, 2006

(54) ALL-IN-ONE HEADSET

(75) Inventors: Shinji Kuraoka, Kanagawa (JP);
Takuya Yokoyama, Kanagawa (JP);
Shinichi Ohgo, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/796,878

(22) Filed: Mar. 9, 2004

(65) Prior Publication Data

US 2005/0201569 A1    Sep. 15, 2005

(51) Int. Cl.
*H04R 1/10* (2006.01)

(52) U.S. Cl. .................. 381/74; 381/367; 381/376; 379/428.02; 379/430

(58) Field of Classification Search ................ 381/74, 381/376; 379/428.02, 428.03, 430, 433.01, 379/433.4

See application file for complete search history.

(56) References Cited

U.S. PATENT DOCUMENTS

| | | | | | |
|---|---|---|---|---|---|
| 5,210,791 | A | * | 5/1993 | Krasik | 379/377 |
| 5,359,647 | A | * | 10/1994 | Regen et al. | 455/566 |
| 5,608,794 | A | * | 3/1997 | Larson | 379/396 |
| 5,793,865 | A | * | 8/1998 | Leifer | 379/430 |
| 2002/0076060 | A1 | * | 6/2002 | Hall et al. | 381/74 |

* cited by examiner

*Primary Examiner*—Huyen Le
*Assistant Examiner*—Corey Chau
(74) *Attorney, Agent, or Firm*—Pearne & Gordon LLP

(57) ABSTRACT

An all-in-one headset worn on the user's head, comprises a head band, a first housing arranged at the head band, a communication unit having selectable at least two communication channels and selectable at least two communication modes, an operating panel mounted on the outside wall of the first housing for selecting one communication channel and one communication mode, an ear-speaker mounted on the inside wall of the first housing, a microphone, a second housing for housing the microphone, a boom member for supporting the second housing to the first housing, an indicating unit for indicating the indication indicative of the selected communication channel and the selected communication mode.

2 Claims, 4 Drawing Sheets

ALL-IN-ONE HEADSET

BACKGROUND OF THE INVENTION

1. Field of the Invention

The present invention relates to an all-in-one headset, which has a constitution that all elements necessary for radio contact with other persons, that is, a communication unit, a microphone, an ear speaker, and a battery are assembled on a head band to be worn on a user's head, and more particularly to an all-in-one headset providing an indicating unit indicating operating states of the headset which the user can catch in a field of view, with the headset worn can look at.

2. Description of the Related Art

Up until now, there have so far been proposed and used in a wide variety of applications and across a broad range of industries. For example, in the fast food industry, each of working staffs at fast food restaurants wears a headset to receive orders from patrons.

The conventional all-in-one headset comprises a head band, an electronics housing arranged at one end of the head band, and a microphone boom stretching forth from the bottom of the electronics housing (See U.S. Pat. No. 6,406, 811).

The electronics housing contains a communication unit and a battery.

The electronics housing provides an earphone on its inside wall, and an operation panel for operating the communication unit on the outside wall.

The user of the conventional headset thus constructed can blindly operate control buttons arranged on the touch pad from experience with the headset worn on the user's head.

Further, the user with the headset worn can also estimate the operating states of the headset by touching the touch panel from experience The above-mentioned conventional headset, however, encounters such a problem that laborious works of removing the headset from the user's head, whenever the user wishes to recognize the operating states of the headset visually.

SUMMARY OF THE INVENTION

In view of the foregoing problem, it is an object of the present invention to provide an all-in-one headset equipping an indicating unit indicating the operating states, which the user can catch in a field of view, with the headset worn.

An all-in-one headset to be worn on a user's head according to the present invention, comprises, a head band; a first housing arranged at one end of said head band, said first housing having an inside wall contacting with an ear lobule of said user, and an outside wall on the opposite side of said inside wall; a boom member stretching forward from said first housing, a second housing arranged at the top end of said boom member; a microphone for converting the voice of said user into an electric signal, said microphone being housed in said second housing, a communication unit for transmitting the electric signal converted by said microphone, and receiving an electric signal indicative of a communicating partner, with one communication mode between two communication modes using one communication channel between two communication channels, said communication unit being housed in said first housing; an ear speaker for converting the electric signal indicative of a communicating partner into sound, said ear speaker being arranged on said inside wall; an operating panel having a communication channel selecting switch for outputting a communication channel selecting signal, and a communication mode selecting switch for outputting a communication mode selecting signal; a control unit for controlling said communication unit so as to operate with one communication mode selected in accordance with said communication mode selecting signal, using one communication channel selected in accordance with said communication channel selecting signal, said control unit being housed in said first housing; a display control signal generating unit for generating a display control signal indicative of the communication channel selected by said communication channel selecting signal and the communication mode selected by said communication mode selecting signal, said display control signal generating unit being housed in said first housing; and an indicating unit for displaying a sign indicative of the communication channel selected by said communication channel selecting signal and the communication mode selected by said communication mode selecting signal in accordance with said display control signal generated in said display control signal generating unit, said indicating unit being arranged on the circumference wall of said second housing.

The all-in-one headset according the present invention thus constructed as mentioned above makes it possible that a user with the all-in-one headset worn catch the indicating unit showing the indication corresponding to the selected communication channel and communication mode in a field of view.

In the all-in-one headset according to the present invention, the indicating unit includes at least two light emitting diodes, each thereof emits light of a color different from each other, and the display control signal generating unit controls on/off states and blinking patterns of said light emitting diodes.

The all-in-one headset according the present invention thus constructed as mentioned above makes the constitution of the indicating unit simple.

In the all-in-one headset according to the present invention, the display control signal generating unit turns on one light emitting diode which emits light of color corresponding to said selected communication channel, and blinks said turned on light emitting diode a cycle corresponding to the selected communication mode.

The all-in-one headset according the present invention thus constructed as mentioned above makes it possible that the user recognizes the operating states of the all-in-one headset with the color and blinking pattern of light.

In the all-in-one headset according to the present invention, the indicating unit consists of a liquid crystal display panel displaying at least two alpha-numerals.

The all-in-one headset according the present invention thus constructed as mentioned above makes it possible that the indicating unit indicates the operating states of the headset with alpha-numerals.

In the all-in-one headset according to the present invention, the display control signal generating unit controls the liquid crystal display panel so that one alpha-numeral shows the selected communication channel, and the other alpha-numeral shows the selected communication mode.

The all-in-one headset according the present invention thus constructed as mentioned above makes it possible that the user directly recognizes the operating states of the all-in-one headset by alpha-numerals visually.

BRIEF DESCRIPTION OF THE DRAWINGS

The present invention will be better understood from the following detailed description when considered in connection with the accompanying drawings, wherein.

DESCRIPTION OF THE PREFERRED EMBODIMENT

Referring now to FIGS. 1 to 5 of the drawings, there is shown a preferred embodiment of the all-in-one headset according to the present invention.

Figure 1:
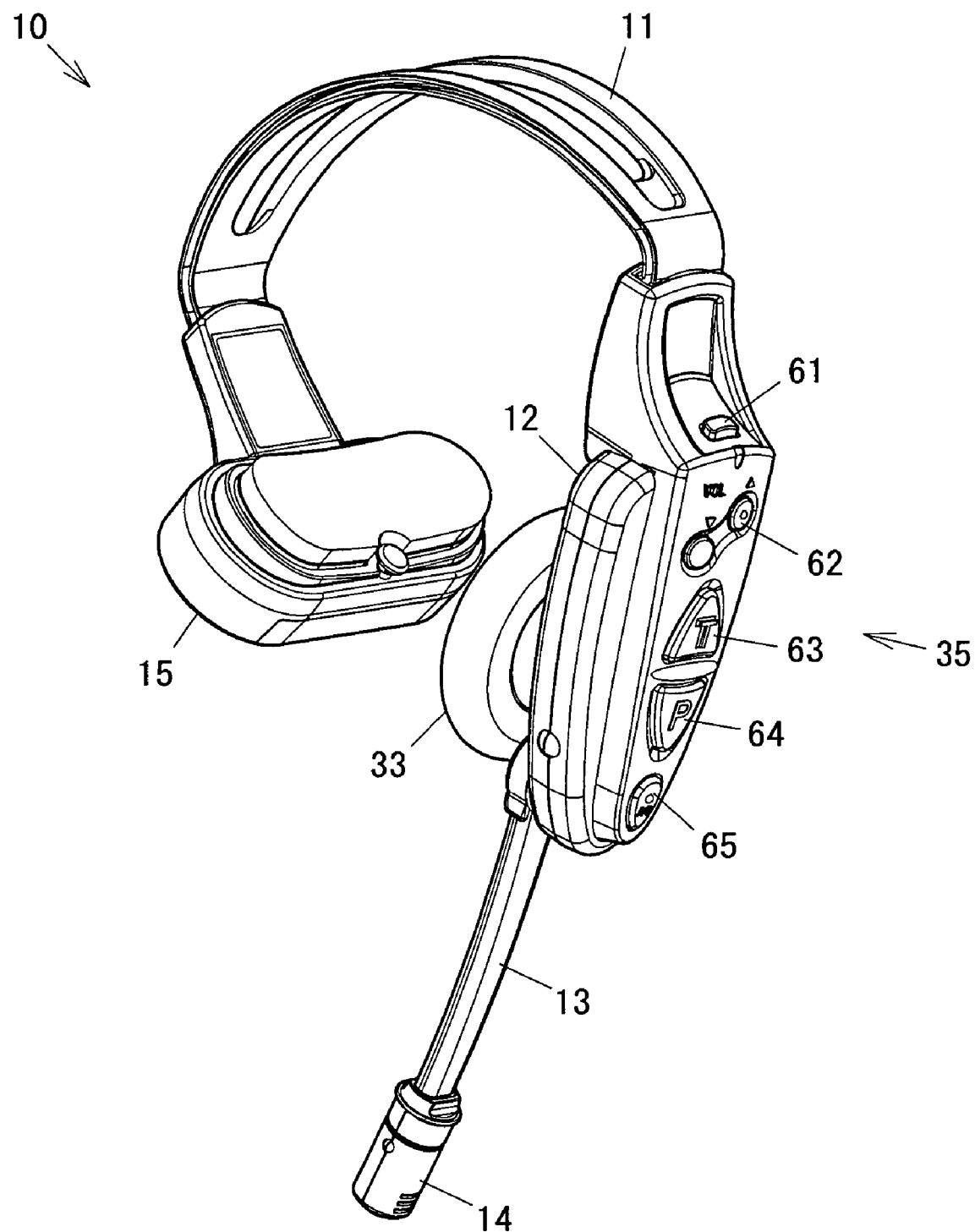
FIG. 1 is a perspective view of the headset according to the present invention viewing from the right hand side of the headset.
Figure 2:
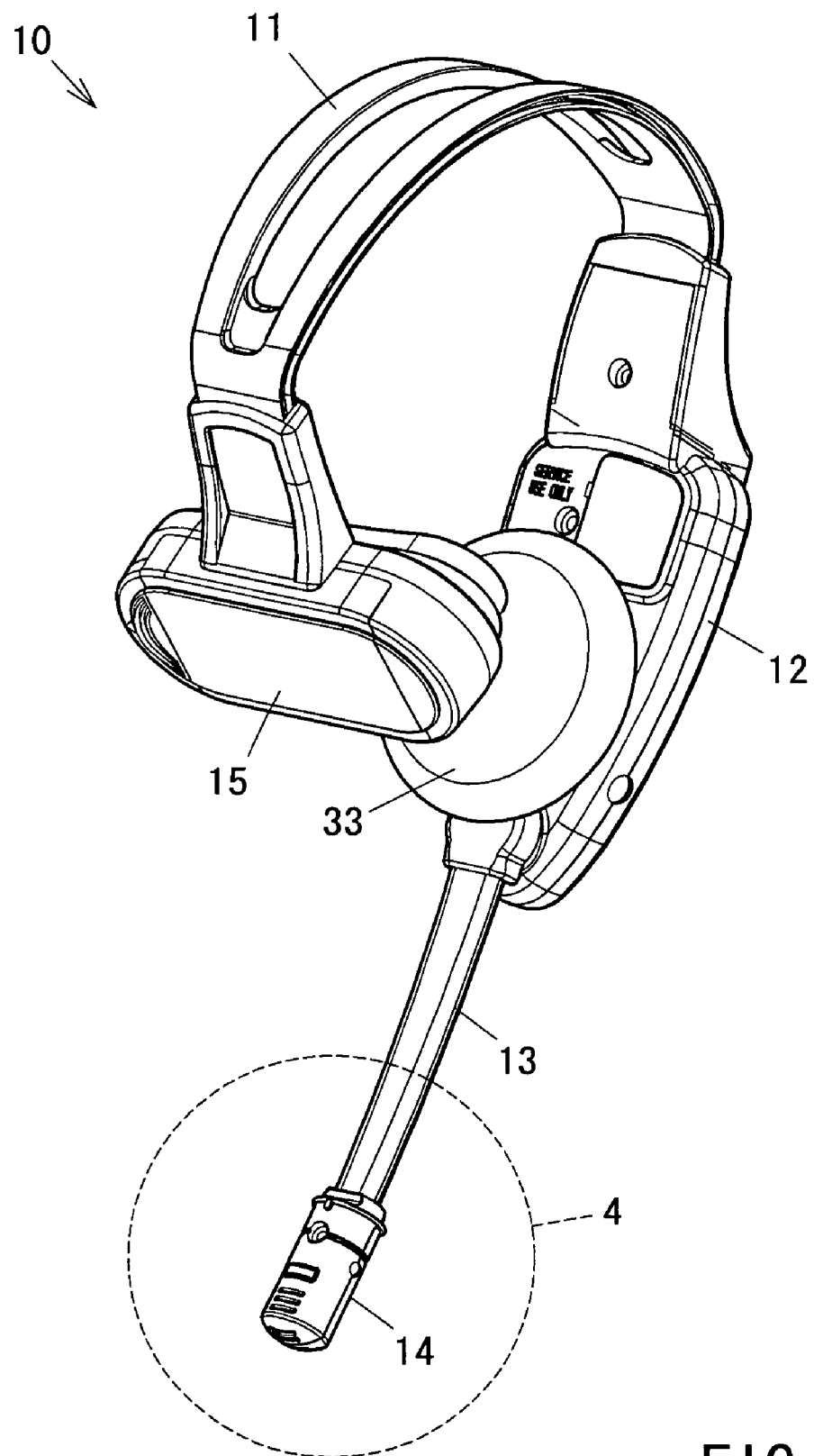
FIG. 2 is a perspective view of the headset according to the present invention viewing from the left hand side of the headset.

The all-in-one headset 10 is shown in FIGS. 1 and 2 as comprising a head band 11, a first housing 12 arranged at one end of the headband 11, a boom member 13 stretching forward from the first housing 12, a second housing 14 arranged at the leading edge of the boom member 13, and a battery housing 15 arranged at the other end of the head band 11.

Figure 3:
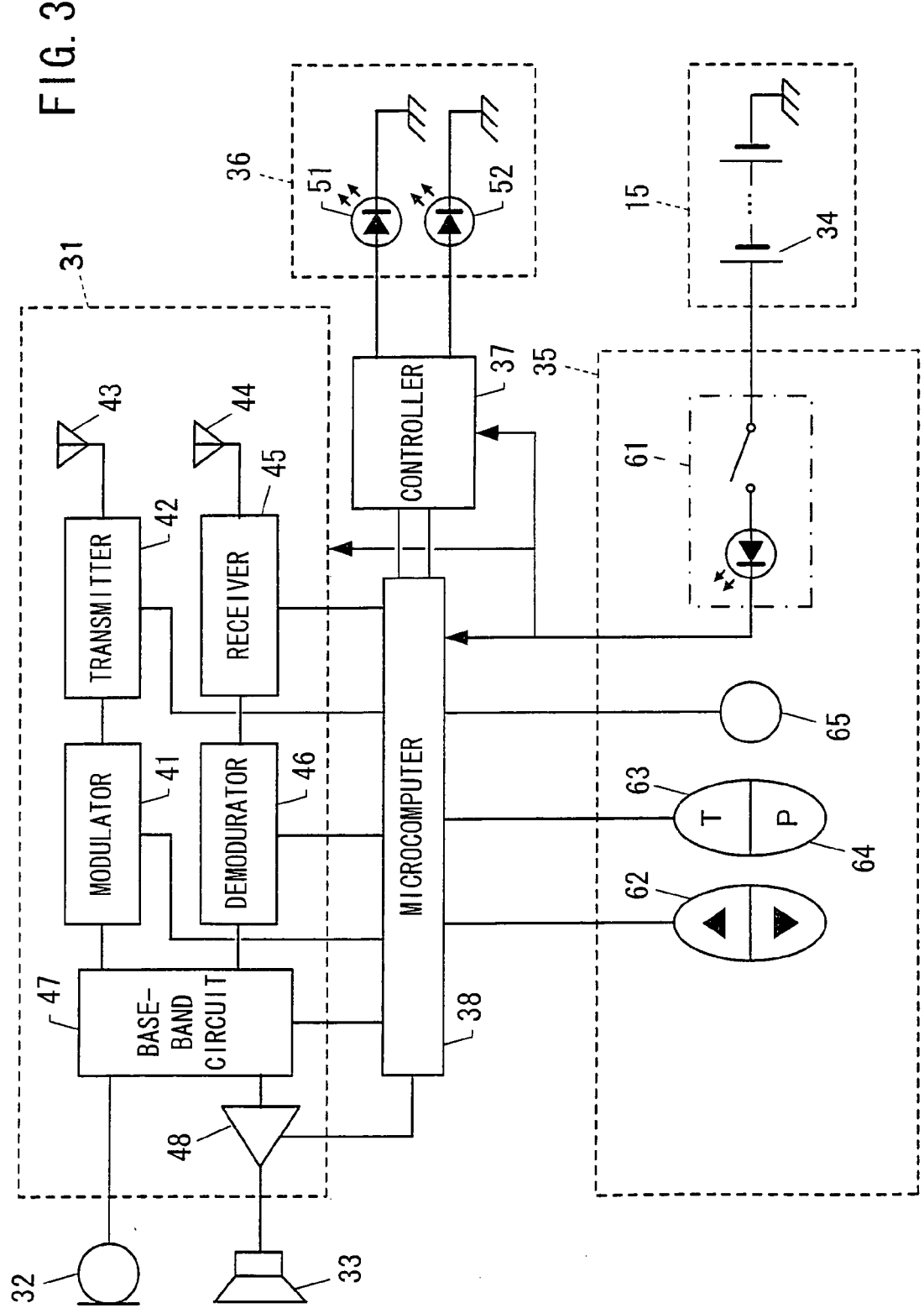
FIG. 3 is a block diagram of the headset according to the present invention.

As shown in FIG. 3, the all-in-one headset 10 according to the present invention electrically comprises a communication unit 31 for establishing radio contact with other persons, a microphone 32 for converting the user's voice into an electric signal transmitted to the communication unit 31, an ear speaker 33 for converting electric signal indicative of communication partners' voices received by the communication unit 31 into a sound, a battery 34 powering the communication unit 31, an operating panel 35 for outputting operation signals to the communication unit 31, a microcomputer 36 for controlling the communication unit 31 based on the operation signals output from the operating panel 35, an indicating unit 37 for showing the operating states of the communication unit 31, and a control unit 38 for controlling the indicating patterns of the indicating unit 37.

As shown in FIG 3, the all-in-one headset 10 according to the present invention electrically comprises a communication unit 31 for establishing radio contact with other persons, a microphone 32 for converting the user's voice into an electric signal transmitted to the communication unit 31, an ear speaker 33 for converting electric signal indicative of communication partners' voices received by the communication unit 31 into a sound, a battery 34 powering the communication unit 31, an operating panel 35 for outputting operation signals to the communication unit 31, a microcomputer 38 for controlling the communication unit 31 based on the operation signals output from the operating panel 35, an indicating unit 36 for showing the operating states of the communication unit 31, and a control unit 37 for controlling the indicating patterns of the indicating unit 36.

The microphone 32 is housed in the second housing 14 arranged at the leading edge of the boom member.

The ear speaker 33 is mounted on the inside wall of the first housing 12, and the operating panel 35 is mounted on the outside wall of the first housing 12.

The battery 34 is housed in the battery housing 15 arranged at the other end on the head band 11.

Figure 4:
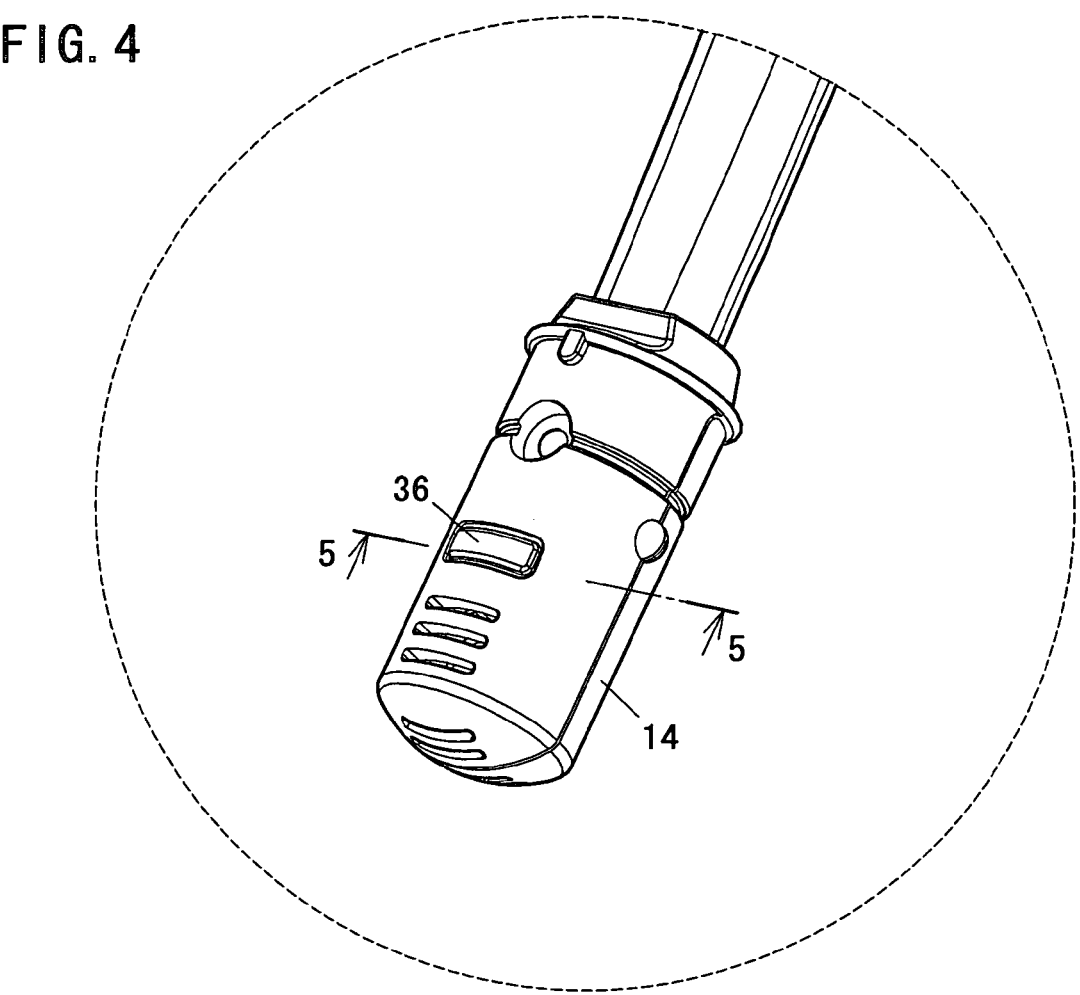
FIG. 4 is an enlarged view of the leading edge of the microphone boom.

The indicating unit 36 is shown in FIG. 4 to be embedded in a part visible by the user of the circumferential wall of the second housing 14.

As shown in FIG. 3, the communication unit 31 housed in the first housing 12 includes a modulator 41 modulating a sub carrier by the electric signal from the microphone 32, a transmitter 42 and a transmission antenna 43 transmitting the modulated sub carrier, a receiving antenna 44 and a receiver 45 receiving the sub carrier carrying the electric signal indicative of the communication partners' voice, and a demodulator 46 demodulating the electric signal indicative of the communication partners' voices from the sub carrier received by the receiver 45.

Further, the communication unit 31 includes a base band circuit 47 compressing the electric signal from the microphone 32 and expanding the electric signal demodulated by the demodulator 46, and an amplifier 48 amplifying the expanded electric signal.

On the operating panel 35, there are arranged a power button & indicator 61, a volume control button 62, a talk button 63, a page button 64, and a channel selection button 65.

The power button & indicator 61 is a button for powering on/off the communication unit 31, the microcomputer 38 and the control unit 37, and emits light in green during power on state. If the battery 34 requires recharging, the power button & indicator 61 emits light in red.

The volume control button 62 is a button for tuning level of the sound output from the ear speaker 33.

The talk button (T) 63 is a button pushed when the user communicates with communication partners belonging to one group, and the page button (P) 64 is a button pushed when the user communicates with communication partners belonging to another group.

The channel selection button 65 is a button for selecting one communication channel among a plurality of communication channels.

Figure 5:
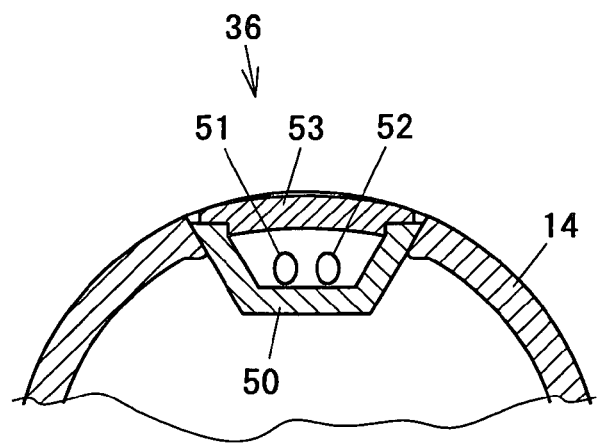
FIG. 5 is a cross sectional view of the indicator.

The indicating unit 36 is shown in FIG. 5 to comprise a recess well 50 embedded in the circumference wall of the second housing 14, a first light-emitting diode 51 and a second light-emitting diode 52 arranged on the bottom of the recess well 50, and a smoke cover 53 covering the recess well 50.

The first light-emitting diode 51 emits light in a certain color, for example, red, and the second light-emitting diode 52 emits light in another color, for example, green.

The operation of the all-in-one headset according to the present invention will be described hereinafter.

The following description will now be directed to the case that the user is assumed to be a working staff of a fast food restaurant having two lanes A and B, and the user is assigned to lane A.

In this case, the user wears the all-in-one headset on the user's head, after the user pushes the power button & indicator 61, and the power button & indicator 61 emits light in green to show power ON.

The user selects channel A as a communication channel by operating the channel selection button 65 on the operating panel 35, because the user is assigned to lane A.

The microcomputer 38 recognizes that channel A is selected with the channel selection button 65, and set the frequency of the sub carrier of the communication unit 31 as channel A.

The user pushes the talk button (T) 63 on the operating panel 35, when the user is going to communicate with patrons.

The microcomputer 38 recognizes that the talk button (T) 63 is pushed, and controls the communication mode of the communication unit 31 as talk mode.

Further, the microcomputer 38 outputs electric signals which indicate that channel A is selected as the communication channel, and the talk mode is selected as the communication mode to the control unit 37.

The control unit 37 receives the electric signals which indicate that channel A is selected, and controls the first light-emitting diode 51 in the indicating unit 36 so as to illuminate red.

Further, the control unit 37 receives the electric signals which indicate that the talk mode is selected, and controls the first light-emitting diode 51 so as to blink a fixed cycle.

The user can correctly recognize that channel A is selected as the communication channel and the talk mode is selected as the communication mode, because the user with the headset worn can catch the indicating unit 36 which is blinking the fixed cycle, in red in a field of view.

When the user communicates with other working stuffs in the fast food restaurant, the user changes the communication mode to the page mode by pushing the page button (P) 64 on the operating panel 35.

When the microcomputer 38 recognizes that the page button (P) 64 is pushed, the microcomputer 38 changes the communication mode to the page mode, and outputs electric signals which indicates that the page mode is selected, to the control unit 37.

The control unit 37 receives the electric signals which indicate that the page mode is selected, and controls the first light-emitting diode 51 so as to blink an irregular cycle.

Therefore, the user can recognize that channel A is selected as the communication channel and the page mode is selected as the communication mode, because the user with the headset worn can see the indicating unit 36 blinking the irregular cycle in red.

The user selects channel B by operating the channel selection button 65 on the operating panel, when the user is assigned to lane B.

When the microcomputer 38 recognizes that channel B is selected by operating the channel selection button 65, the microcomputer 38 sets the frequency of the sub carrier of the communication unit 31 to channel B, and outputs the electric signals which indicates that channel B is selected, to the control unit 37.

The control unit 37 receives the electric signals which indicate that channel A is selected, and controls the second light-emitting diode 52 so as to illuminate green.

Further, the control unit 37 receives the electric signals which indicate that the talk mode is selected, and controls the first light-emitting diode 51 so as to blink a fixed cycle.

Therefore, the user can recognize that channel B is selected as the communication channel and the talk mode is selected as the communication mode, because the user with the headset worn can catch the indicating unit 36 blinking the fixed cycle in green in a field of view.

The control unit 37 receives the electric signals which indicate that the page mode is selected, and controls the first light-emitting diode 51 so as to blink an irregular cycle.

Therefore, the user can recognize that channel B is selected as the communication channel and the page mode is selected as the communication mode, because the user with the headset worn can see the indicating unit 36 blinking the fixed cycle in green in a field of view.

The indicating unit may include a third light-emitting diode which emit light in a color other than red and green, for example, orange, and may indicate that the battery 34 is powering to the communication unit 31 by continuous lighting in orange, and that the battery 34 requires recharging by flickering in orange.

In the above description, the indicator applying a plurality of light emitting diodes as display elements is described, but the user is required to understand to which operating state the luminescence color and blinking pattern of light emitting diode corresponds.

To solve the above problem, a small size liquid crystal panel, which displays two digits of alpha-numerals may be applied as the indicator.

In this case, as one alpha-numeral indicates the selected communication channel by displaying "A" or "B", and the other alpha-numeral indicates the applied communication mode by displaying "T" or "P", the user can directly recognize the selected communication channel and the selected communication mode.

While the subject invention has been described with relation to the preferred embodiments, various modifications and adaptations thereof will now be apparent to those skilled in the art as far as such modifications and adaptations fall within the scope of the appended claims intended to be covered thereby.

The invention claimed is:

1. An all-in-one headset to be worn on a user's head, comprising:
   a head band;
   a first housing arranged at one end of said head band, said first housing having an inside wall contacting with an ear lobule of said user, and an outside wall on the opposite side of said inside wall;
   a boom member stretching forward from said first housing;
   a second housing arranged at the top end of said boom member;
   a microphone for converting the voice of said user into an electric signal, said microphone being housed in said second housing,
   a communication unit for transmitting the electric signal converted by said microphone, and receiving an electric signal indicative of a communicating partner, with one communication mode between two communication modes using one communication channel between two communication channels, said communication unit being housed in said first housing;
   an ear speaker for converting the electric signal indicative of a communicating partner into sound, said ear speaker being arranged on said inside wall;
   an operating panel having a communication channel selecting switch for outputting a communication channel selecting signal, and a communication mode selecting switch for outputting a communication mode selecting signal;
   a control unit for controlling said communication unit so as to operate with one communication mode selected in accordance with said communication mode selecting signal, using one communication channel selected in accordance with said communication channel selecting signal, said control unit being housed in said first housing;
   a display control signal generating unit for generating a display control signal indicative of the communication channel selected by said communication channel selecting signal and the communication mode selected by said communication mode selecting signal, said display control signal generating unit being housed in said first housing; and an indicating unit for indicating a sign indicative of the communication channel selected by said communication channel selecting signal and the communication mode selected by said communication mode selecting signal in accordance with said display control signal generated in said display control signal generating unit, said indicating unit being arranged on the circumference wall of said second housing, in which said indicating unit includes at least two light emitting diodes, each thereof emits light of a color different from each other, and said display control signal generating unit controls on/off states and blinking patterns of said light emitting diodes by turning on one light emitting diode which emits light of color corresponding to said selected communication channel, and blinks said turned on light emitting diode a cycle corresponding to the selected communication mode.

2. An all-in-one headset to be worn on a user's head, comprising:

a head band;

a first housing arranged at one end of said head band, said first housing having an inside wall contacting with an ear lobule of said user, and an outside wall on the opposite side of said inside wall;

a boom member stretching forward from said first housing;

a second housing arranged at the top end of said boom member;

a microphone for converting the voice of said user into an electric signal, said microphone being housed in said second housing;

a communication unit for transmitting the electric signal converted by said microphone, and receiving an electric signal indicative of a communicating partner, with one communication mode between two communication modes using one communication channel between two communication channels, said communication unit being housed in said first housing;

an ear speaker for converting the electric signal indicative of a communicating partner into sound, said ear speaker being arranged on said inside wall;

an operating panel having a communication channel selecting switch for oulputting a communication channel selecting signal, and a communication mode selecting switch for outputting a communication mode selecting signal;

a control unit for controlling said communication unit so as to operate with one communication mode selected in accordance with said communication mode selecting signal, using one communication channel selected in accordance with said communication channel selecting signal, said control unit being housed in said first housing;

a display control signal generating unit for generating a display control signal indicative of the communication channel selected by said communication channel selecting signal and the communication mode selected by said communication mode selecting signal, said display control signal generating unit being housed in said first housing; and an indicating unit for indicating a sign indicative of the communication channel selected by said communication channel selecting signal and the communication mode selected by said communication mode selecting signal in accordance with said display control signal generated in said display control signal generating unit, said indicating unit being arranged on the circumference wall of said second housing, in which said indicating unit includes a liquid crystal display panel displaying at least two alpha-numerals, and said display control signal generating unit controls said liquid crystal display panel so that one alpha-numeral shows said selected communication channel, and the other alpha-numeral shows said selected communication mode.

* * * * *

UNITED STATES PATENT AND TRADEMARK OFFICE
CERTIFICATE OF CORRECTION

PATENT NO. : 7,031,475 B2  Page 1 of 1
APPLICATION NO. : 10/796878
DATED : April 18, 2006
INVENTOR(S) : Shinji Kuraoka et al.

It is certified that error appears in the above-identified patent and that said Letters Patent is hereby corrected as shown below:

Please delete the paragraph at column 3, lines 31-45 in its entirety.

Please insert the following paragraph immediately after the paragraph at column 3, line 60:

--The communication unit 31, the control unit 37, and the microcomputer 38 are housed in the first housing 12.--

Column 8, line 5, please delete "oulputting", and insert therefor --outputting--.

Signed and Sealed this

Twenty-second Day of August, 2006

JON W. DUDAS
*Director of the United States Patent and Trademark Office*